United States Patent
McLean et al.

(10) Patent No.: US 12,013,974 B2
(45) Date of Patent: Jun. 18, 2024

(54) PROVISIONING A COMPUTING SUBSYSTEM WITH DISAGGREGATED COMPUTING HARDWARE RESOURCES SELECTED IN COMPLIANCE WITH A PHYSICAL LOCATION REQUIREMENT OF A WORKLOAD

(71) Applicant: Lenovo Enterprise Solutions (Singapore) Pte. Ltd., Singapore (SG)

(72) Inventors: James G. McLean, Raleigh, NC (US); Fred A. Bower, III, Durham, NC (US); Jeffery J. Van Heuklon, Rochester, MN (US)

( * ) Notice: Subject to any disclaimer, the term of this patent is extended or adjusted under 35 U.S.C. 154(b) by 315 days.

(21) Appl. No.: 17/219,231

(22) Filed: Mar. 31, 2021

(65) Prior Publication Data

US 2022/0318433 A1    Oct. 6, 2022

(51) Int. Cl.
| | |
|---|---|
| *G06F 21/00* | (2013.01) |
| *G06F 9/50* | (2006.01) |
| *G06F 21/44* | (2013.01) |
| *G06F 21/62* | (2013.01) |
| *G06F 21/71* | (2013.01) |

(52) U.S. Cl.
CPC ............ *G06F 21/71* (2013.01); *G06F 9/5011* (2013.01); *G06F 9/5088* (2013.01); *G06F 21/44* (2013.01); *G06F 21/6218* (2013.01)

(58) Field of Classification Search
CPC .... G06F 9/5011; G06F 21/44; G06F 21/6218; G06F 21/71
See application file for complete search history.

(56) References Cited

U.S. PATENT DOCUMENTS

| | | | |
|---|---|---|---|
| 10,348,574 B2 * | 7/2019 | Kulkarni | H04L 41/0893 |
| 2013/0238785 A1 * | 9/2013 | Hawk | G06F 9/5077 |
| | | | 709/224 |
| 2014/0136710 A1 * | 5/2014 | Benari | G06F 9/5044 |
| | | | 709/226 |

(Continued)

FOREIGN PATENT DOCUMENTS

| | | | | |
|---|---|---|---|---|
| EP | 3382544 A1 * | 10/2018 | | G06F 3/0604 |
| WO | WO-03075125 A2 * | 9/2003 | | G01S 5/02 |

*Primary Examiner* — Rodman Alexander Mahmoudi
(74) *Attorney, Agent, or Firm* — Jeffrey L. Streets (57) ABSTRACT

A computer program product includes program instructions configured for execution by a processor to perform various operations. The operations include accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource. The operations further include identifying a first workload request that requests performance of a first workload, identifying a physical location requirement for the first workload, selecting a subset of the disaggregated computing hardware resources to be included in a first computing subsystem for performance of the first workload in compliance with the physical location requirement for the first workload, provisioning of the first computing subsystem, and assigning the first computing subsystem to perform the first workload.

20 Claims, 5 Drawing Sheets

(56) References Cited

U.S. PATENT DOCUMENTS

| | | | |
|---|---|---|---|
| 2015/0074175 A1* | 3/2015 | Musial | H04L 67/10 |
| | | | 709/203 |
| 2015/0248338 A1* | 9/2015 | Klein | G06F 11/3688 |
| | | | 714/37 |
| 2016/0306993 A1* | 10/2016 | Sand-Soll | G06F 21/31 |
| 2016/0352695 A1* | 12/2016 | Kozolchyk | H04L 9/40 |
| 2018/0307517 A1* | 10/2018 | Devendran | G06F 9/5077 |
| 2019/0354413 A1* | 11/2019 | Bivens | G06F 9/5083 |
| 2019/0384516 A1 | 12/2019 | Bernat et al. | |
| 2020/0004650 A1 | 1/2020 | Hanko et al. | |
| 2021/0084103 A1* | 3/2021 | Smith | G06F 11/1479 |
| 2022/0035669 A1* | 2/2022 | Fernandez Orellana | |
| | | | G06F 9/505 |

\* cited by examiner

PROVISIONING A COMPUTING SUBSYSTEM WITH DISAGGREGATED COMPUTING HARDWARE RESOURCES SELECTED IN COMPLIANCE WITH A PHYSICAL LOCATION REQUIREMENT OF A WORKLOAD

BACKGROUND

The present disclosure relates to composable computer systems.

BACKGROUND OF THE RELATED ART

A composable computer system, also referred to as composable infrastructure, treats compute devices, storage devices, memory devices and network devices as separate pools of resources that can be provisioned as needed, depending on the capacity and performance requirements of a given workload. The composable computer system decouples compute, storage, and networking resources from their hardware to make them accessible by any device in a data center. For the most part, the resources are disaggregated, which means that a single device may not contain all types of resources. Rather, each device is dedicated to a specific resource type.

As an example, a first workload with a high computational workload may require substantial compute resources, such as processors, while requiring only minimum data storage resources. Conversely, a second workload may generate lots of data, therefore requiring a vast amount of data storage resources and relatively little compute resources. Accordingly, a composer application having knowledge of the requirements of a particular workload may compose a system that includes a sufficient amount of each resource to perform the particular workload. The required amount of compute, memory, storage and/or network resources are selected from available resource pools, and the particular workload may then be performed on the selected resources. When the selected resources have completed the particular workload, the selected resources may be made available to the resource pool for subsequent allocation to another workload.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may include accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource. The operations may further include identifying a first workload request that requests performance of a first workload, identifying a physical location requirement for the first workload, selecting a subset of the disaggregated computing hardware resources to be included in a first computing subsystem for performance of the first workload in compliance with the physical location requirement for the first workload, provisioning of the first computing subsystem, and assigning the first computing subsystem to perform the first workload.

DETAILED DESCRIPTION

Some embodiments provide a computer program product comprising a non-volatile computer readable medium and non-transitory program instructions embodied therein, the program instructions being configured to be executable by a processor to cause the processor to perform various operations. The operations may include accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource. The operations may further include identifying a first workload request that requests performance of a first workload, identifying a physical location requirement for the first workload, selecting a subset of the disaggregated computing hardware resources to be included in a first computing subsystem for performance of the first workload in compliance with the physical location requirement for the first workload, provisioning of the first computing subsystem, and assigning the first computing subsystem to perform the first workload.

In some embodiments, the operations may be performed by a management server which may be referred to as a composer when managing the disaggregated computing hardware resources within a composable computing system. The operations may be performed by a processor of the management server executing the program instructions, which may be included in a resource management application, such as the LENOVO XCLARITY Administrator (LENOVO and XCLARITY are trademarks of Lenovo in the United States).

In some embodiments, the operations may further include collecting, for each of the disaggregated computing hardware resources in the composable computing system, the hardware characteristics of the disaggregated computing hardware resource from each of the disaggregated computing hardware resources. The hardware characteristics of each of the disaggregated computing hardware resources may then be stored in the system resource database. The hardware characteristics may include vital product data stored on an electronically erasable programmable read only memory (EEPROM) or otherwise made available or advertised by the individual disaggregated computing hardware resources. Optionally, the disaggregated computing hardware resources may include a plurality of hardware blocks, such as a compute block, storage block, memory block, network interconnections and/or network switches. Preferably, the hardware characteristics may be collected and stored for each of the independently composable hardware resources within a hardware block. For example, for a compute block including four compute nodes that are independently composable, it is preferable to obtain hardware characteristics for each of the individual compute nodes. Non-limiting examples of hardware characteristics for a compute node may include the number of cores in the processor, the processor speed, and an amount of cache memory. It is a technical advantage that embodiments described herein identify a physical location of each disaggregated computing hardware resource and include the physical location in the hardware characteristics that describe the disaggregated computing hardware resource.

A physical location may be indicated with varying degrees of specificity, such as an absolute location designated by latitude and longitude values or a location identifier designating a predefined campus, building, facility, department, room, or geographic/geopolitical region. The composer may also associate each physical location with one or more specific location characteristic of that physical location, such as a security level, authorization level, privacy level. In some embodiments, the identified physical location requirement for the first workload may require that all of the disaggregated computing hardware resources selected for the first computing subsystem be located in one or more physical locations having a specific location characteristic or type, such as a high security level.

In some embodiments, the first workload request that requests performance of a first workload is identified in response to receiving the first workload request from an initiator or remote client. For example, an initiator may send the workload request to the composer, thereby requesting performance of the first workload and providing any requirements that the composer should satisfy in the selection and provisioning of a computing subsystem to perform the workload. The workload request may include any one or more requirements for the workload, such as a physical location requirement for the first workload. Accordingly, the composer may consider each of the requirements during the selection of a subset of the disaggregated computing hardware resources to be provisioned in computing subsystem to which the workload will be assigned and performed. In one option, the composer may apply one or more physical location rules, such as if the first workload request does not specifically include a physical location requirement but does identify a first workload type for the first workload. Accordingly, a physical location rule applied by the composer may provide a predetermined association between the identified first workload type and a physical location requirement for the first workload.

In some embodiments, the identified physical location requirement for the first workload may require storage of information on a storage device that is identified as being in a physical location designated as being a high-security location. Accordingly, the composer may provision a computing subsystem including a storage device selected, at least in part, because the hardware database reflects that the selected storage device has a physical location that has been designated as a high-security location. However, the final selection of the storage device may also consider other hardware characteristics, such as an available capacity meeting or exceeding the data storage requirements of the first workload, in combination with the physical location requirement. In a specific example, each of the data storage devices selected to be included in the first computing subsystem and/or each of the compute and memory resources necessary to perform a workload may be located in a geopolitical region to satisfy specific legal compliance regulations, such as the European Union's General Data Protection Regulation (GDRP).

In some embodiments, the identified physical location requirement for the first workload may require that all of the disaggregated computing hardware resources selected for the first computing subsystem be located in a specific physical location. For example, the first computing subsystem may include a compute resource, storage resource, memory resource, interconnections and network switch that are each located in a specific physical location that satisfies the identified physical location requirement. In one specific implementation, each of the hardware resources selected to be provisioned in the first computing subsystem may be located in a given high-security computer lab that has been designated for performing a software development.

In some embodiments, the identified physical location requirement for the first workload may require that redundant copies of data generated by the first workload be stored at first and second physical locations. Accordingly, the first computing subsystem may include a first data storage device located in the first physical location for storing a first copy of the data and a second data storage device located in a second physical location for storing a second copy of the data. Storage of data on multiple data storage devices in separate physical locations may be desirable for loss prevention as a result of a natural disaster or similar event.

In some embodiments, the operation of selecting the subset of the disaggregated computing hardware resources to be included in the first computing subsystem may include selecting at least one disaggregated computing device, selecting at least one disaggregated data storage device, and selecting at least one disaggregated memory device. Still further, the operation of selecting the subset of the disaggregated computing hardware resources to be included in the first computing subsystem may further include selecting at least one network switch and/or selecting at least one network connection between the selected subset of the disaggregated computing hardware resources.

In some embodiments, the operations may further include monitoring, for each of the disaggregated computing hardware resources in the composable computing system, network traffic originating from any of the disaggregated computing hardware resources in the first computing subsystem during performance of the first workload. In one option, any of the network traffic from the disaggregated computing hardware resources in the first computing subsystem may be prevented from being routed through hardware resources that would not comply with the physical location requirement for the first workload during performance of the first workload on the first computing subsystem. In another option, any of the network traffic from the disaggregated computing hardware resources in the first computing subsystem may be prevented from being routed through any hardware resource that is not included in the first computing subsystem during performance of the first workload on the first computing subsystem. In a composable system, the composable system definition and deployment mechanism may incorporate and adapt to knowledge of candidate hardware physical location, interconnect locations, and network routing locations. For example, a computing subsystem that was provisioned to perform a given workload having a physical location requirement requiring all of the hardware resources be physically located at a particular physical site may attempt communications or access between an initiator computer in a lab area (within the particular physical site) and a target computer in an office area (also within the particular physical site). Although both the initiator computer hardware and the target computer hardware satisfy the physical location requirement by the fact that they are physically located within the particular physical site, network traffic from the initiator computer in the lab could route out from the site to an external server before coming back into the target computer in the office area. Such network routing could violate the physical location requirement. Accordingly, the composer (composition engine) that is selecting computing hardware resources for a workload having a physical location requirement limited to the site may recognize that a particular network routing would be out of compliance with the physical location requirement. To avoid this situation, the computer may selected hardware resources, including the interconnections and network resources, that would enable the resulting computing subsystem to support network routing between the lab computer and the office computer while remaining in compliance with the physical location requirement or at least trigger a notification of flag to the user prior to creation of the composed subsystem. In one option, network resources that are located outside of the physical location for the first workload may be used by securing the network link with some form of target to initiator endpoint encryption tunneling. Thus, the composer may use knowledge of physical and network routing layers to alter the settings, details, and/or hardware of the first computing subsystem to maintain the security that may be the basis for the physical location requirement for the first workload.

In some embodiments, the operations may further include provisioning an additional one or more of the disaggregated computing hardware resources to the first computing subsystem, wherein the additional one or more disaggregated computing hardware resources are in compliance with the physical location requirement for the first workload. At least a portion of the first workload may then be migrated to the additional one or more disaggregated computing hardware resources. Accordingly, the composer may expand the composed computing subsystem as needed to perform the first workload or satisfy other workload requirement while continuing to meet the physical location requirement for the first workload.

In some embodiments, the operations may further include identifying a second workload request that specifies a second workload to perform, and identifying that there is no physical location requirement for the second workload. Since the second workload does not include a physical location requirement, a subset of the disaggregated computing hardware resources to be included in a second computing subsystem may be selected for performance of the second workload without regard to the physical location of the disaggregated computing hardware resources. The second computing subsystem may be provisioned and assigned to perform the second workload.

In some embodiments, it is determined whether the physical location of the selected hardware resources is accurately reflected in the hardware resource database before actually provisioning the first computing subsystem. For example, the operations may further include verifying, immediately prior to provisioning the first computing subsystem, that each of the disaggregated computing hardware resources selected to be included in the first computing subsystem for performance of the first workload are currently in compliance with the physical location requirement for the first workload. In a related option, the current location of the selected hardware resources may be verified immediately prior to assigning the first workload to the first computing subsystem. In another option, any one of the disaggregated computing hardware resources selected to be included in the first computing subsystem for performance of the first workload may be determined to be out of compliance with the physical location requirement for the first workload in response to the disaggregated computing hardware resource experiencing physical movement within a predetermined period of time. Such physical movement may be detected with a motion sensor, such as an accelerometer or global positioning system (GPS) sensor, integrated with the hardware resource and immediately reported to the composer.

In some embodiments, the operations may further include a re-composition of the first computing subsystem (i.e., repeating the selection of disaggregated computing hardware resources and the provisioning of the first computing subsystem for perform the first workload) in response to detecting a change in any of the conditions considered above, such as detecting a breach of the security of the physical location. For example, if it is detected that interconnect traffic is being (or has been) rerouted to a new device in a non-compliant physical location, perhaps due to a load balancing or failure recovery event, then a full recomposition of the first computing subsystem may be triggered to maintain compliance or a partial recomposition may be triggered to remove the out-of-compliance component of the first computing subsystem.

Composable infrastructure may be considered as combining hardware-disaggregated servers and software-defined infrastructure. Disaggregation unbinds local hardware resources, such as processors, memory, storage and network I/O such that composed subsystems are no longer bound by a server chassis or a traditional motherboard. Then, with a unified control plane and API, these physical and logical resources are pooled and management software composes the hardware resources on demand so that a computing subsystem can be created to conform to the unique requirements of the workload.

Figure 1:
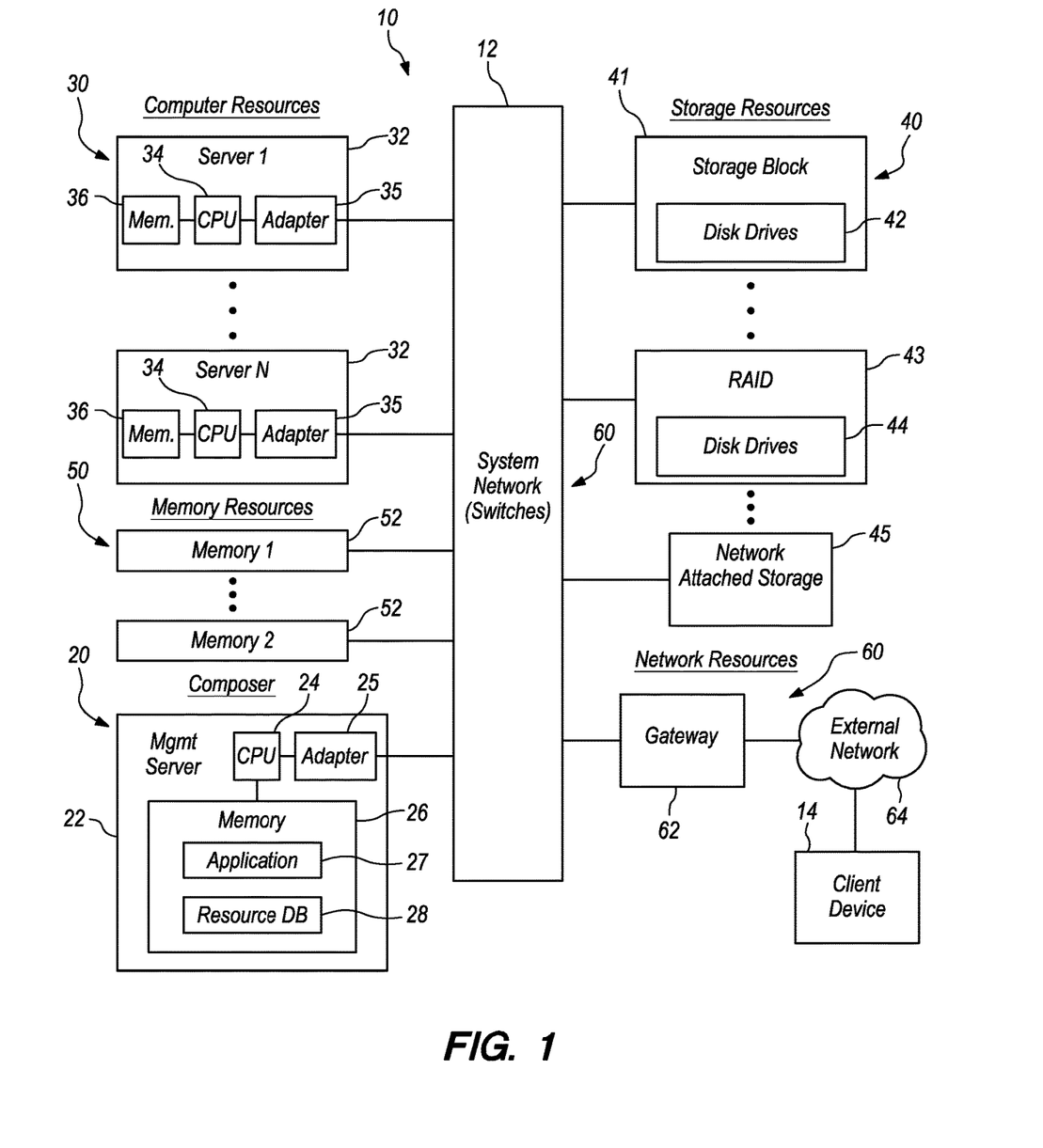
FIG. 1 is a diagram of a composable computer system including a composer that may implement some embodiments.

FIG. 1 is a diagram of a composable computer system 10 including a composer 20 that may implement some embodiments. The composable computer system 10 may further include various disaggregated computing hardware resources, including compute resources 30, storage resources 40, memory resources 50, and interconnect and network resources 60. For example, the composer 20 may take the form of a management server 22 including a central processing unit or processor 24, a network adapter 25 to facilitate communication over the system network 12, and memory 26. The memory 26 may store a composer application 27 that includes program instructions that, when executed by the processor 24, cause the processor to perform various operations that implement one or more embodiments described herein. The memory 26 may further store or otherwise access a system resource database 28 that stores hardware characteristics for each of the other resources in the composable computer system 10.

In the non-limiting illustration of FIG. 1, the compute resources 30 include a number of servers 32 (Server 1 to Server N), each server 32 including at least one processor 34, a network adapter 35 to facilitate communication over the system network 12, and may include some degree of memory 36. For example, the memory 36 may provide a boot image, an operating system, or other applications. The storage resources 40 may include, without limitation, a storage block 41 with a plurality of disk drives 42, a redundant array of independent disks (RAID) with a plurality of disk drives 44, and a network-attached storage (NAS) system 45. The memory resources 50 may include volatile and non-volatile memory devices. The network resources 60 may include network interconnections, network switches, and an optional gateway 62 for accessing an external network 64 such as the Internet.

In some embodiments, the composer 20 may access the system resource database 28, where the system resource database 28 includes, for each of unit of the plurality of disaggregated computing hardware resources 30, 40, 50, 60 within a composable computing system 10, hardware characteristics that describe the disaggregated computing hardware resource. The system resource database 28 may identify many different hardware characteristics of each unit of the hardware resources, but embodiments specifically include a physical location of each unit of the disaggregated computing hardware resources. For example, system resource database 28 may have a separate hardware inventory entry for each independently composable unit of the compute resources 30, storage resources 40, memory resources 50, and network resources 60 which may include a physical location for each of the units. Each compute node or server 32 may have a different physical location; each storage block 41, RAID 43 and/or network-attached storage (NAS) system 45 may have a different physical location; each memory unit 52 may have a different physical location; and each unit of the interconnect and/or switches and gateway 62 may have a different physical location. Each of these physical locations should be reflected in the system resource database 28.

The composer 22 may further identify a first workload request that requests performance of a first workload. The composer 22 may, for example, receive the first workload request from a client device 14 via the external network 64 and gateway 62. The composer 22 may then identify a physical location requirement for the first workload and select a subset of the disaggregated computing hardware resources 30, 40, 50, 60 to be included in a first computing subsystem for performance of the first workload in compliance with the physical location requirement for the first workload. Next, the composer 22 may provision the first computing subsystem and assign the first computing subsystem to perform the first workload.

Figure 2:
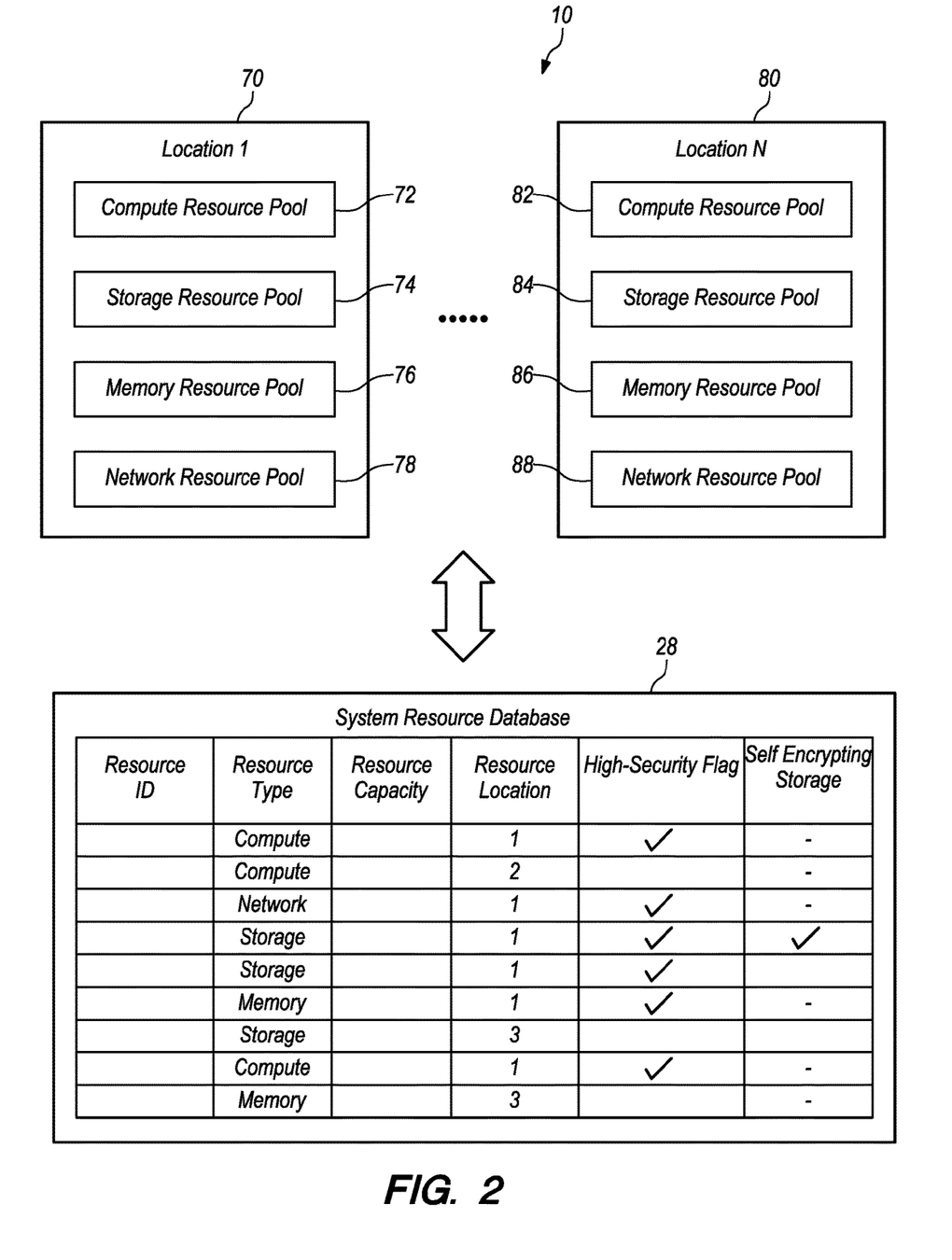
FIG. 2 is a diagram illustrating that a resource database is populated with information about available composable computer system resources, including the location of each resource.

FIG. 2 is a diagram illustrating that the system resource database 28 is populated with information about the hardware resources available in the composable computer system 10, including the location of each resource. As shown, the composable computer system resources are illustrated as being spread over a number ("N") of locations. Location 1 includes a compute resource pool 72, a data storage resource pool 74, a memory resource pool 76, and a network resource pool 78. Location N includes a compute resource pool 82, a data storage resource pool 84, a memory resource pool 86, and a network resource pool 88. The composer is illustrated creating or updating the system resource database 28 by obtaining data about each hardware component in the composable computer system. The system resource database 28 is shown including a row for each hardware resource that is discovered within the composable computer system 10. The system resource database 28 is also shown including a plurality of columns, include a column for recording a resource ID, a column for recording a resource type, and a column for recording a resource capacity or other performance specification. Still further, the system resource database 28 include a column for recording the physical location of each resource. A column is also provided for recording a high-security flag, although the association between a physical location and the security level or high-security flag could be established separately without being specifically included in each record (row) of the database. However, in this illustration the high-security flag is illustrated to show that Location 1 is a high-security location, wherein Locations 2 and 3 are not high-security locations. While all of the resources in Location 1 meet the physical location requirement, the system resource database 28 further includes a column (specific to data storage resources) that identifies whether the data storage is self-encrypting data storage. Should a workload request include both a physical location requirement and a self-encrypting storage requirement, then the system resource database 28 would select the one or more storage resource that satisfied both requirements.

In one hypothetical scenario, a company may maintain a database of sensitive customer information, such as income levels, account numbers, client lists, sales activity, and the like. The company may therefore require that such information be stored in a high-security physical environment. The composer would then select a composable computing subsystem or at least a data storage device that the system resource database shows to be in a physical location having a high-security level and provision that subsystem for performance of the workload or data storage. The composer may further consider physical location and a security level associated with the physical location when creating/composing/provisioning a computing subsystem, re-composing a computing subsystem, migrating some or all of a workload to a different subsystem or hardware resource, or performing other actions on the composed environment. Accordingly, the composer may manage the computing subsystems so that a workload or task is performed in a manner that satisfies a physical location requirement for the workload. Conversely, if a workload does not have a physical location requirement, then the composer may provision computing subsystems that include hardware resource located both within and outside the high-security locations.

Figure 3:
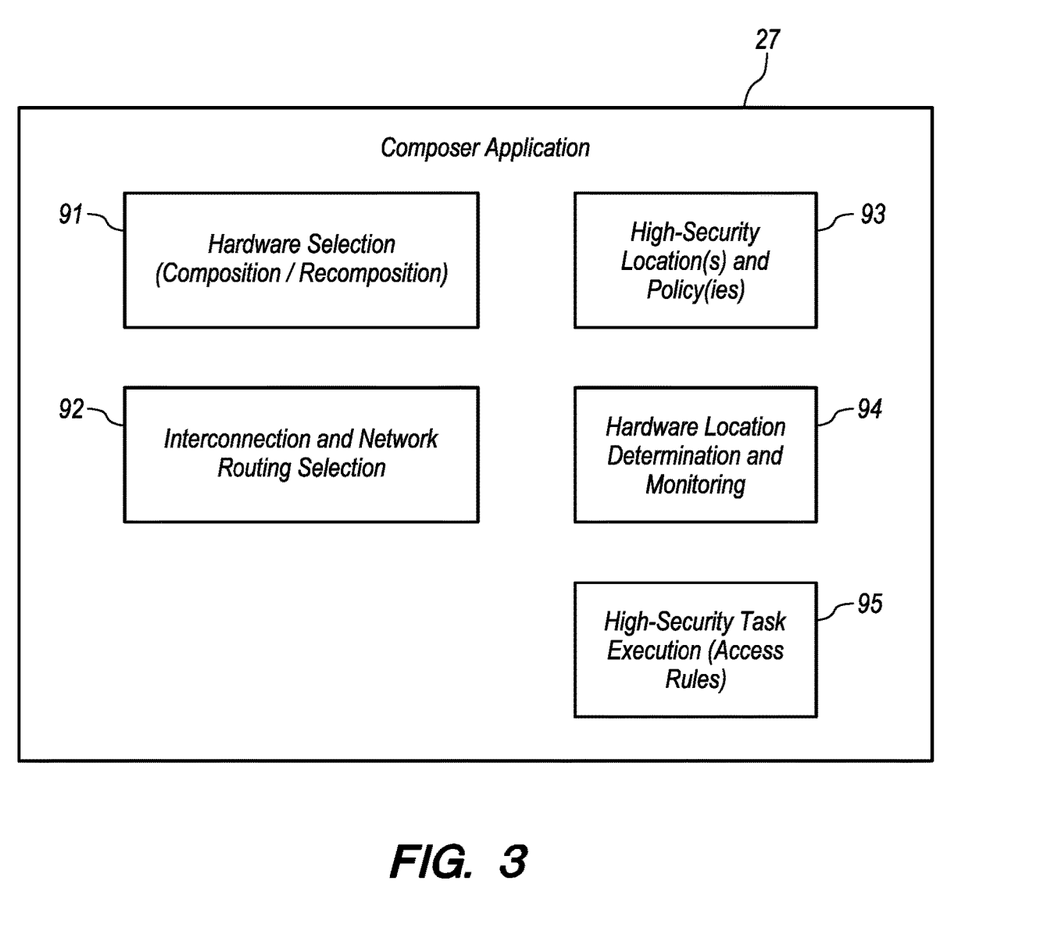
FIG. 3 is a diagram of a composer application having various modules for implementing some embodiments.

FIG. 3 is a diagram of a composer application 27 having various modules for implementing some embodiments. A hardware selection module 91 may select hardware resources to be composed or provisioned into a computing subsystem for performing a particular workload having a particular physical location requirement. An interconnection and network routing selection module 92 may select interconnection and network resources to be composed or provisioned into the computing subsystem so that network traffic is in compliance with the physical location requirement. A high-security location(s) and policy(ies) module 93 may identify a security level and/or security policies for each of the physical locations for which there are hardware resources in the composable computing system. A hardware location determination and monitoring module 94 may be responsible for determining and verifying the physical location of each hardware resource. A high-security task execution (access rules) module 95 may identify and execute the workloads or tasks and make sure that the workload is executed in compliance with the physical location requirement and that hardware or processes external to the physical location are unable to access the composed computing subsystem during execution of the workload.

Figure 4:
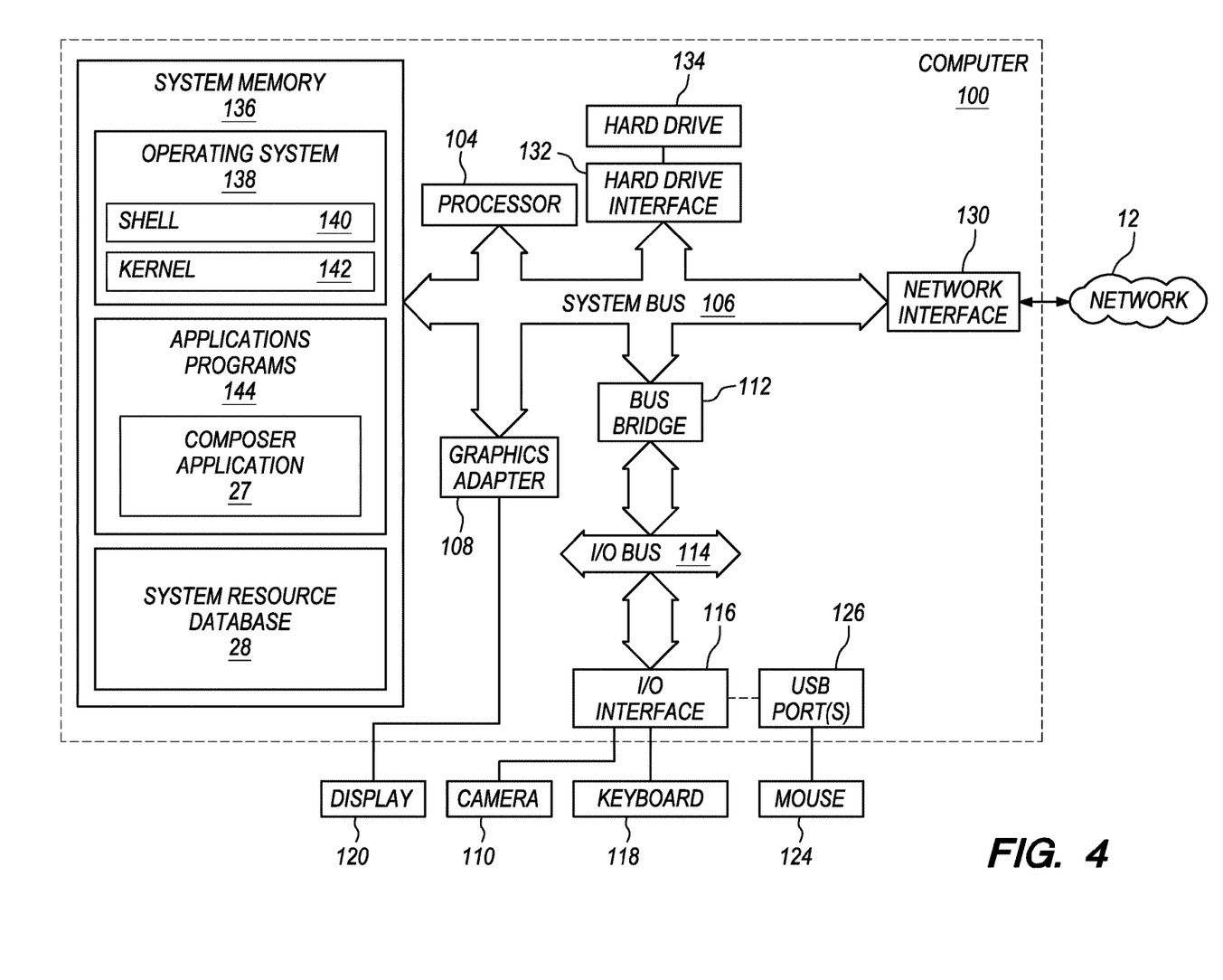
FIG. 4 is block diagram of a computer that may perform various operations in accordance with some embodiments.

FIG. 4 is block diagram of a computer 100 that may be representative of the management server 22 of FIG. 1 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other system resources over the network 12 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the composable computer system management ("composer") application 27 that causes the processor 104 to perform the operations according to one or more embodiments.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 5:
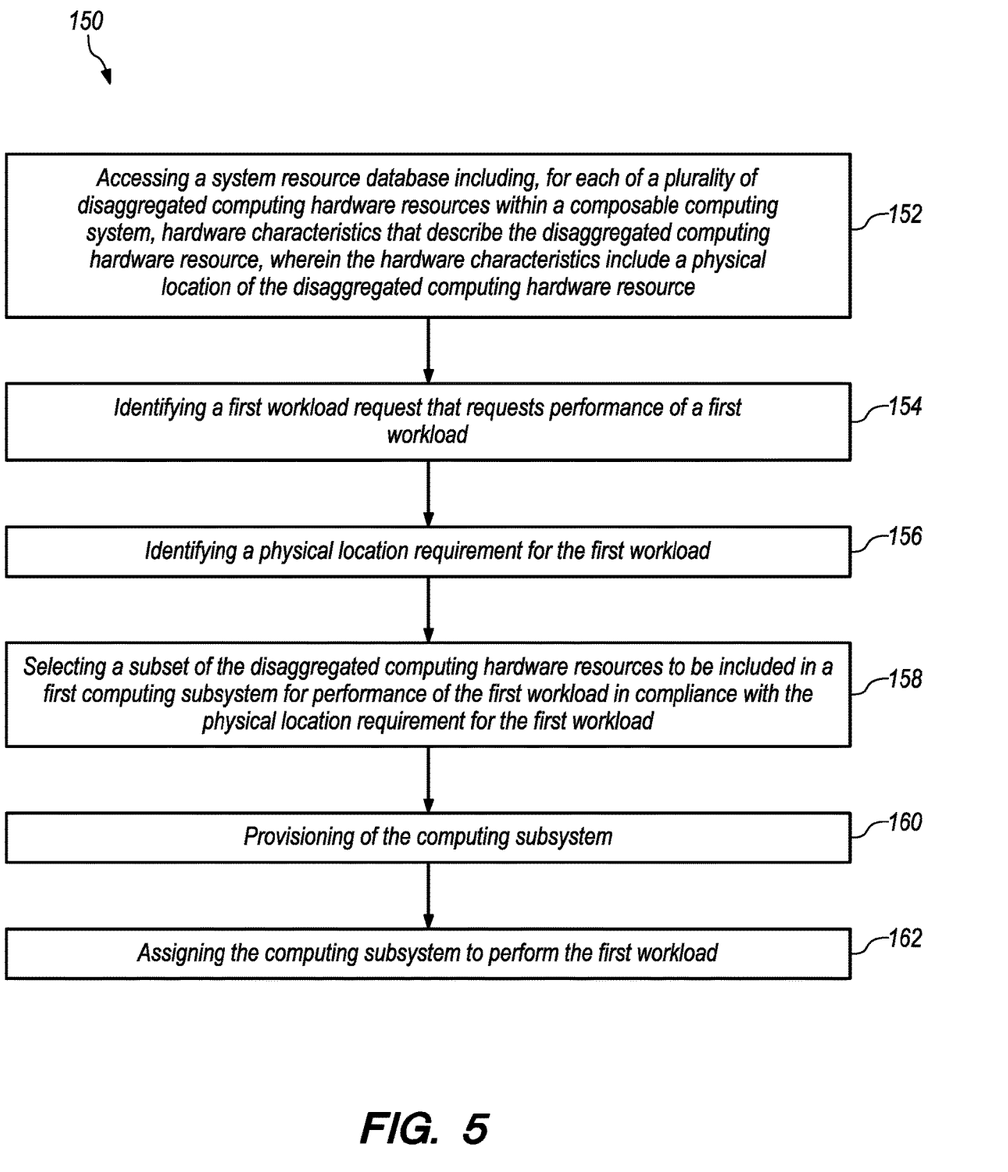
FIG. 5 is a flowchart of a process for composing resources to perform a workload.

FIG. 5 is flowchart of operations 150 for composing hardware resources to form a computing subsystem to perform a first workload having a physical location requirement in accordance with some embodiments. Operation 152 includes accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource. Operation 154 includes identifying a first workload request that requests performance of a first workload. Operation 156 includes identifying a physical location requirement for the first workload. Operation 158 includes selecting a subset of the disaggregated computing hardware resources to be included in a first computing subsystem for performance of the first workload in compliance with the physical location requirement for the first workload. Operation 160 includes provisioning of the first computing subsystem. Operation 162 includes assigning the first computing subsystem to perform the first workload.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource;
   identifying a first workload request that requests performance of a first workload;
   identifying a physical location requirement for the first workload;
   selecting a subset of the disaggregated computing hardware resources to be included in a first computing subsystem for performance of the first workload in compliance with the physical location requirement for the first workload, wherein the identified physical location requirement for the first workload requires that all of the disaggregated computing hardware resources selected for the first computing subsystem be located in one or more physical locations having a specific location characteristic;
   provisioning of the first computing subsystem; and
   assigning the first computing subsystem to perform the first workload.

2. The computer program product of claim 1, wherein the identified physical location requirement for the first workload requires storage of information on a storage device that is identified as being in a physical location designated as being a high-security location.

3. The computer program product of claim 1, wherein the identified physical location requirement for the first workload requires that all of the disaggregated computing hardware resources selected for the first computing subsystem be located in a specific physical location.

4. The computer program product of claim 3, wherein the specific physical location is a facility, a geographic location, or a geopolitical region.

5. The computer program product of claim 1, wherein the specific location characteristic is a high security location.

6. The computer program product of claim 1, further comprising:
   selecting a network connection between the selected subset of the disaggregated computing hardware resources.

7. The computer program product of claim 1, wherein the physical location requirement for the first workload is identified in the first workload request.

8. The computer program product of claim 1, further comprising:
   collecting, for each of the disaggregated computing hardware resources in the composable computing system, the hardware characteristics of the disaggregated computing hardware resource from each of the disaggregated computing hardware resources; and storing the hardware characteristics of each of the disaggregated computing hardware resources in the system resource database.

9. The computer program product of claim 1, further comprising:

monitoring, for each of the disaggregated computing hardware resources in the composable computing system, network traffic between any of the disaggregated computing hardware resources in the first computing subsystem during performance of the first workload; and preventing any of the network traffic between the disaggregated computing hardware resources in the first computing subsystem from being routed through hardware resources that would not comply with the physical location requirement for the first workload during performance of the first workload on the first computing subsystem.

10. The computer program product of claim 1, further comprising:

monitoring, for each of the disaggregated computing hardware resources in the composable computing system, network traffic between the disaggregated computing hardware resources in the first computing subsystem during performance of the first workload; and preventing any of the network traffic between the disaggregated computing hardware resources in the first computing subsystem from being routed through any hardware resource that is not included in the first computing subsystem during performance of the first workload on the first computing subsystem.

11. The computer program product of claim 1, wherein selecting the subset of the disaggregated computing hardware resources to be included in the first computing subsystem includes:

selecting at least one disaggregated computing device;

selecting at least one disaggregated data storage device; and selecting at least one disaggregated memory device.

12. The computer program product of claim 11, wherein selecting the subset of the disaggregated computing hardware resources to be included in the first computing subsystem further includes:

selecting at least one network switch.

13. The computer program product of claim 1, further comprising:

including an additional one or more of the disaggregated computing hardware resources to the first computing subsystem, wherein the additional one or more disaggregated computing hardware resources are in compliance with the physical location requirement for the first workload; and migrating at least a portion of the first workload to the additional one or more disaggregated computing hardware resources.

14. The computer program product of claim 1, further comprising:

identifying a second workload request that specifies a second workload to perform;

identifying that there is no physical location requirement for the second workload;

selecting a subset of the disaggregated computing hardware resources to be included in a second computing subsystem for performance of the second workload without regard to the physical location of the disaggregated computing hardware resources;

provisioning the second computing subsystem; and assigning the second computing subsystem to perform the second workload.

15. The computer program product of claim 1, further comprising:

verifying, immediately prior to provisioning the first computing subsystem, that each of the disaggregated computing hardware resources selected to be included in the first computing subsystem for performance of the first workload are currently in compliance with the physical location requirement for the first workload.

16. The computer program product of claim 15, wherein any one of the disaggregated computing hardware resources selected to be included in the first computing subsystem for performance of the first workload are determined to be out of compliance with the physical location requirement for the first workload in response to the disaggregated computing hardware resource experiencing physical movement within a predetermined period of time.

17. A computer program product comprising a non-volatile computer readable medium and non-transitory program instructions embodied therein, the program instructions being configured to be executable by a processor to cause the processor to perform operations comprising:

accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource;

identifying a first workload request that requests performance of a first workload;

identifying a physical location requirement for the first workload, wherein the identified physical location requirement for the first workload requires that a copy of data generated by the first workload to be stored at first and second physical locations;

selecting a subset of the disaggregated computing hardware resources to be included in a first computing subsystem for performance of the first workload in compliance with the physical location requirement for the first workload, wherein the first computing subsystem includes a first data storage device located in the first physical location for storing a first copy of the data and a second data storage device located in a second physical location for storing a second copy of the data;

provisioning of the first computing subsystem; and assigning the first computing subsystem to perform the first workload.

18. The computer program product of claim 17, wherein the physical location requirement for the first workload is identified in the first workload request.

19. A computer program product comprising a non-volatile computer readable medium and non-transitory program instructions embodied therein, the program instructions being configured to be executable by a processor to cause the processor to perform operations comprising:

accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource;

identifying a first workload request that requests performance of a first workload;
identifying a physical location requirement for the first workload;
selecting a subset of the disaggregated computing hardware resources to be included in a first computing subsystem for performance of the first workload in compliance with the physical location requirement for the first workload, wherein the identified physical location requirement for the first workload designates that the first computing subsystem must include one or more disaggregated computing hardware resources in a physical location having a technician that is currently physically present at the physical location;
provisioning of the first computing subsystem; and
assigning the first computing subsystem to perform the first workload.

20. A computer program product comprising a non-volatile computer readable medium and non-transitory program instructions embodied therein, the program instructions being configured to be executable by a processor to cause the processor to perform operations comprising:
accessing a system resource database including, for each of a plurality of disaggregated computing hardware resources within a composable computing system, hardware characteristics that describe the disaggregated computing hardware resource, wherein the hardware characteristics include a physical location of the disaggregated computing hardware resource;
identifying a first workload request that requests performance of a first workload, wherein the first workload request identifies a first workload type for the first workload;
identifying a physical location requirement for the first workload, wherein the physical location requirement for the first workload is identified by a predetermined association between the first workload type and the physical location requirement;
selecting a subset of the disaggregated computing hardware resources to be included in a first computing subsystem for performance of the first workload in compliance with the physical location requirement for the first workload;
provisioning of the first computing subsystem; and
assigning the first computing subsystem to perform the first workload.

* * * * *